(12) United States Patent
Ganapathy et al.

(10) Patent No.: US 9,544,191 B2
(45) Date of Patent: *Jan. 10, 2017

(54) SYSTEM AND METHOD FOR IMPROVED COMMUNICATION IN A STORAGE NETWORK

(71) Applicant: Dell Products L.P., Round Rock, TX (US)

(72) Inventors: Narendran Ganapathy, Tamilnadu (IN); Devanathan Krishnan, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,201

(22) Filed: Mar. 10, 2016

(65) Prior Publication Data

US 2016/0191317 A1 Jun. 30, 2016

Related U.S. Application Data

(63) Continuation of application No. 14/047,399, filed on Oct. 7, 2013, now Pat. No. 9,311,022.

(51) Int. Cl.
*G06F 12/00* (2006.01)
*H04L 12/24* (2006.01)
*G06F 3/06* (2006.01)
*H04L 29/08* (2006.01)

(52) U.S. Cl.
CPC .......... *H04L 41/0823* (2013.01); *G06F 3/067* (2013.01); *G06F 3/0619* (2013.01); *G06F 3/0644* (2013.01); *G06F 3/0653* (2013.01); *G06F 3/0665* (2013.01); *G06F 3/0689* (2013.01); *H04L 41/12* (2013.01); *H04L 67/1097* (2013.01); *H04L 67/16* (2013.01)

(58) Field of Classification Search
CPC .... G06F 3/0689; G06F 3/0644; G06F 3/0619; G06F 3/0665
USPC .................................................. 711/149, 114
See application file for complete search history.

(56) References Cited

U.S. PATENT DOCUMENTS

| | | | |
|---|---|---|---|
| 6,785,286 B1 * | 8/2004 | O'Keeffe | H04L 12/2602 370/229 |
| 6,850,997 B1 | 2/2005 | Rooney et al. | |
| 6,865,607 B1 | 3/2005 | de Jong et al. | |
| 7,451,252 B2 * | 11/2008 | Rooney | G06F 11/201 710/36 |
| 8,341,289 B2 | 12/2012 | Hellhake et al. | |
| 8,452,433 B2 | 5/2013 | Terada | |

(Continued)

*Primary Examiner* — Pierre-Michel Bataille
(74) *Attorney, Agent, or Firm* — Haynes & Boone, LLP.

(57) ABSTRACT

A system and method of improved communication in a storage network includes a storage node. The storage node includes a control unit and a plurality of local ports coupled to the control unit and configured to couple the storage node to a storage network. The control unit is configured to discover port addresses of other storage nodes in the storage network, select a first port pair including a first source port selected from the local ports and a first destination port selected from remote ports associated with the port addresses of a first one of the other storage nodes, open a first connection between the first source port and the first destination port, determine whether a less desirable notice associated with the first port pair is received, and when the less desirable notice is received, record the first port pair as being less desirable.

20 Claims, 4 Drawing Sheets

(56) References Cited

U.S. PATENT DOCUMENTS

| | | |
|---|---|---|
| 9,203,716 B2 * | 12/2015 | Wei .................... H04L 43/10 |
| 2002/0080815 A1 | 6/2002 | Vasquez et al. |
| 2003/0079056 A1 | 4/2003 | Taylor |
| 2004/0213266 A1 * | 10/2004 | Willhite .............. H04L 12/5693 |
| | | 370/395.43 |
| 2008/0270644 A1 | 10/2008 | Rooney et al. |
| 2012/0210416 A1 | 8/2012 | Mihelich et al. |
| 2013/0258925 A1 | 10/2013 | Sahu |

* cited by examiner

SYSTEM AND METHOD FOR IMPROVED COMMUNICATION IN A STORAGE NETWORK

CROSS-REFERENCE TO RELATED APPLICATIONS

The present application is a continuation of U.S. Pat. No. 9,311,022, filed on Oct. 7, 2013, which is herein incorporated by reference.

BACKGROUND

The present disclosure relates generally to information handling systems, and more particularly to communication in storage networks.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric. This can be further complicated through other networking trends such as parallelization.

Many networks, such as storage networks, utilize parallelization and other techniques to improve the forwarding function between two network nodes. By employing parallelization, redundancy is built into a network so that it is possible that more than one path exists between any two nodes, thus increasing the likelihood that a network path between any two nodes is available. This provides suitably aware network devices with the ability to select between and among the redundant paths to avoid network congestion, balance network loads, or to avoid failures in the network. In the case of storage area networks (SANs), redundancy and parallelism between the storage server and the storage arrays is often used to help ensure that the storage server can respond to storage requests despite congestion and/or failures. This is often implemented by coupling the storage server to multiple network switching devices, which are, in turn, coupled to multiple storage arrays. This allows network packets to be forwarded between the storage server and the storage arrays using one or many possible network paths through the multiple network switching devices. When additional redundancy is added by introducing inter-switch links (ISLs) between the network switching devices, the possibility of less optimal or desired network paths may be introduced between the storage server and the storage arrays.

Accordingly, it would be desirable to provide improved communication in storage networks that avoids less desirable network paths.

SUMMARY

According to one embodiment, a storage node includes a control unit and a plurality of local ports coupled to the control unit and configured to couple the storage node to a storage network. The control unit is configured to discover port addresses of other storage nodes in the storage network, select a first port pair including a first source port selected from the local ports and a first destination port selected from remote ports associated with the port addresses of a first one of the other storage nodes, open a first connection between the first source port and the first destination port, determine whether a less desirable notice associated with the first port pair is received, and when the less desirable notice is received, record the first port pair as being less desirable.

According to another embodiment, a method of forwarding in a storage network includes discovering port addresses of local ports of a first storage node and remote ports of other storage nodes in the storage network, selecting a first port pair comprising a first source port selected from the local ports and a first destination port selected from the remote ports associated with a first one of the other storage nodes, opening a first connection between the first source port and the first destination port, and determining whether a less desirable notice associated with the first port pair is received. When the less desirable notice is received, the method further includes recording the first port pair as being less desirable, closing the first connection, selecting a second port pair, different from the first port pair, the second port pair including a second source port selected from the local ports and a second destination port selected from the remote ports, wherein the second source port is different from the first source port, the second destination port is different from the first destination port, or the second source port is different from the first source port and the second destination port is different from the first destination port, and opening a second connection between the second source port and the second destination port. Selecting the first port pair and selecting the second port pair is based on previously received less desirable notices.

According to yet another embodiment, a network switching device includes a control unit and a plurality of ports coupled to the control unit, the plurality of ports including a first port configured to couple the network switching device to another network switching device and a second port configured to couple the network switching device to a first storage node in a storage network. The control unit is configured to designate the first port as less desirable, monitor packets received on the plurality of ports to perform address learning, receive a storage packet on the second port from the first storage node, determine an egress port, selected from the plurality of ports, for the storage packet based on the address learning and a destination address included in the storage packet, and when the egress port is designated as less desirable, transmit a less desirable notice to the first storage node.

According to yet another embodiment, an information handling system includes a plurality of switches and a plurality of storage nodes. Each of the switches includes a first control unit and a plurality of first ports. The storage nodes include a first storage node and a second storage node. The first storage node includes a second control unit and a plurality of second ports, each of the second ports being coupled to a corresponding first port on one of the switches. The second storage node includes a third control unit and a plurality of third ports, each of the third ports being coupled to a corresponding first port on one of the switches. Each of the first control units is configured to designate at least one of the first ports as less desirable, monitor packets received on the first ports to perform address learning, receive a storage packet on one of the first ports from the first storage node, and determine an egress port, selected from the first ports, for the storage packet based on the address learning and a destination address included in the storage packet. When the egress port is designated as less desirable, each of the first control units is further configured to transmit a less desirable notice to the first storage node. The second control unit is configured to discover port addresses of the third ports, select a first port pair including a first source port selected from the second ports and a first destination port selected from the third ports, open a first connection between the first source port and the first destination port, determine whether the less desirable notice is received, and when the less desirable notice is received, record the first port pair as being less desirable.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
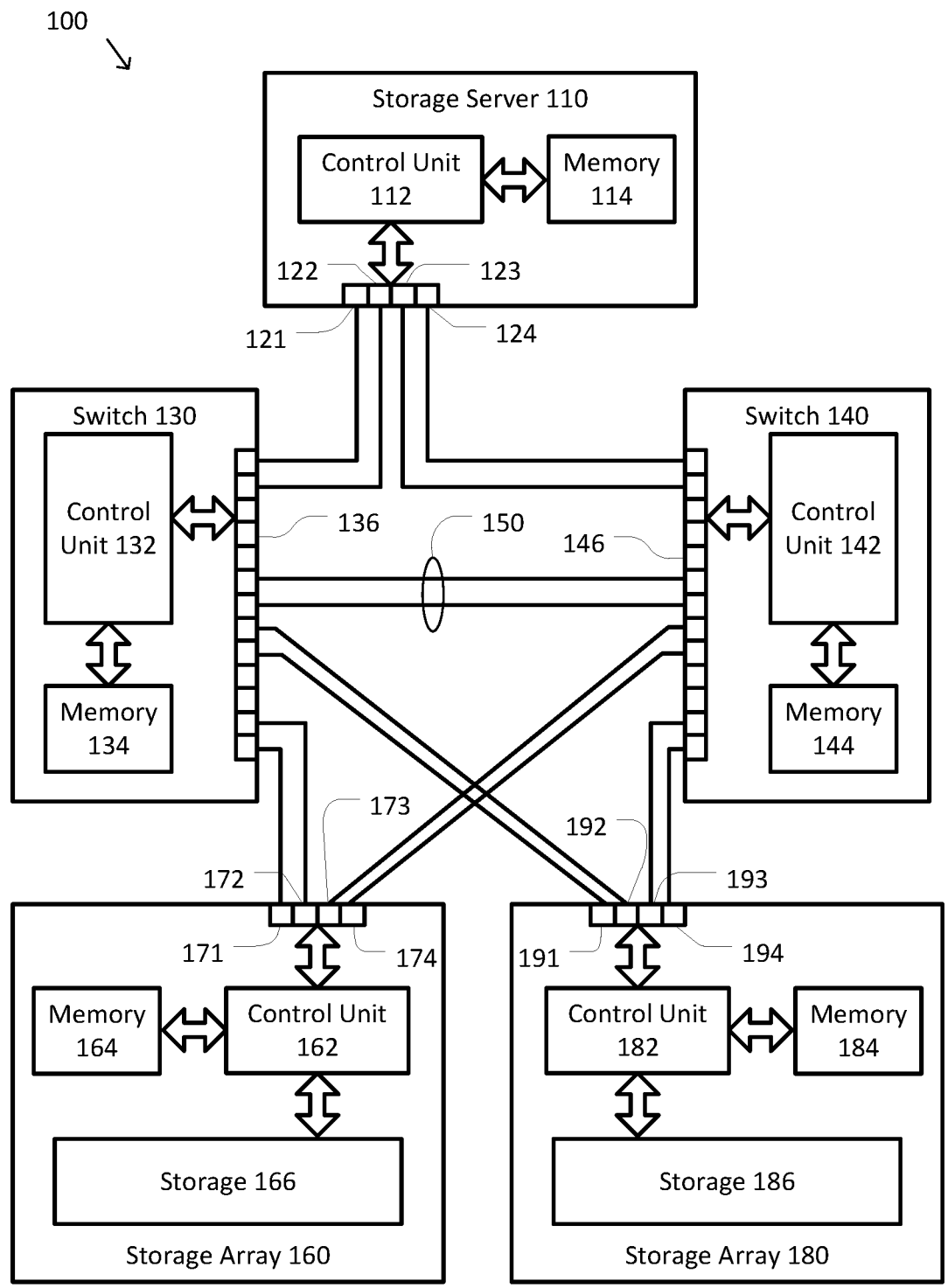
FIG. 1 shows a simplified diagram of a storage network according to some embodiments.

FIG. 1 shows a simplified diagram of a storage network 100 according to some embodiments. As shown in FIG. 1, network 100 includes several storage nodes, including a storage server 110. Storage server 110 includes a control unit 112 and memory 114. The control unit 112 is coupled to the memory 114 and may control the operation of storage server 110. In some examples, control unit 112 may include one or more processors and/or one or more multi-core processors. Storage server 110 further includes ports 121-124 for coupling storage server 110 to network switching devices using network links. In some examples, control unit 112 may use one or more protocols to communicate with the network switching devices using ports 121-124 and network links. In some embodiments, ports 121-124 may be included in one or more network interface cards (NICs). Although storage server 110 is shown with four ports 121-124, any number of ports may be used. In some embodiments, storage server 110 may be compatible with an EqualLogic storage controller as provided by Dell, Inc. of Round Rock, Tex., which implement a SAN using the Internet Small Computer System Interface (iSCSI).

Storage network 100 further includes a network switching device or switch 130. Switch 130 includes a control unit 132 and memory 134. The control unit 132 is coupled to memory 134 and may control the operation of switch 130. In some examples, control unit 132 may be used to make forwarding decisions for network traffic being handled by the switch 130. In some examples, the control unit 132 may include one or more processors and/or one or more multi-core processors. Switch 130 further includes one or more ports 136 for coupling switch 130 to other switches and/or network devices using network links. Control unit 132 may use one or more protocols to communicate with the other switches and network devices using the ports 136 and network links. As shown in FIG. 1, two of the ports 136 of switch 130 are coupled to ports 121 and 122 of storage server 110 using respective network links. Although only two network links are shown between switch 130 and storage server 110, any number of network links coupling a corresponding number of ports in switch 130 and storage server 110 are possible. In some examples, the network links coupling switch 130 to storage server 110 may be combined using a link aggregation group (LAG).

Storage network 100 further includes a switch 140. Like switch 130, switch 130 includes a control unit 142 and memory 144 that may be similar to control unit 132 and memory 134, respectively. Switch 140 further includes one or more ports 146 for coupling switch 140 to other switches and/or network devices using network links. Control unit 142 may use one or more protocols to communicate with the other switches and network devices using the ports 146 and network links. As shown in FIG. 1, two of the ports 146 of switch 140 are coupled to ports 123 and 124 of storage server 110 using respective network links. Although only two network links are shown between switch 140 and storage server 110, any number of network links coupling a corresponding number of ports in switch 140 and storage server 110 are possible. In some examples, the network links coupling switch 140 to storage server 110 may be combined using a LAG. An additional two of the ports 146 are coupled to two of the ports 136 of switch 130 using respective network links. The network links between switch 130 and switch 140 form an inter-switch link (ISL) 150. Although only two network links are shown in ISL 150, any number of network links may be included in ISL 150 that couple together corresponding ports 136 and 146 of switches 130 and 140, respectively. In some examples, ISL 150 may be a LAG.

The storage nodes of storage network 100 further include several storage arrays including storage arrays 160 and 180. Storage array 160 includes a control unit 162 and memory 164. The control unit 162 is coupled to the memory 164 and may control the operation of storage array 160. In some examples, control unit 162 may include one or more processors and/or one or more multi-core processors. Storage array 160 further includes ports 171-174 for coupling storage array 160 to network switching devices using network links. In some examples, control unit 162 may use one or more protocols to communicate with the network switching devices using ports 171-174 and network links. In some embodiments, ports 171-174 may be included in one or more NICs. Although storage array 160 is shown with four ports 171-174, any number of ports may be used. As shown in FIG. 1, ports 171 and 172 of storage array 160 are coupled to two of the ports 136 of switch 130 and ports 173 and 174 are coupled to two of the ports 146 of switch 140 using respective network links. Although only two network links are shown, respectively, between storage array 160 and switches 130 and 140, any number of network links coupled to corresponding ports may be used between storage array 160 and switches 130 and/or switch 140. In some examples, the network links coupling storage array 160 to switches 130 and/or 140 may be combined into respective LAGs.

Storage array 160 further includes storage 166. In some examples, storage 166 may be used to store data and/or information based on one or more storage requests received from storage server 110 via the network links and switches coupling storage array 160 to storage server 110. Storage 166 may include one or more storage devices that each include one or more types of machine readable media. Some common forms of machine readable media usable in storage 166 may include floppy disk, flexible disk, hard disk, magnetic tape, any other magnetic medium, CD-ROM, any other optical medium, RAM, EPROM, FLASH-EPROM, any other memory chip or cartridge, and/or any other medium from which a processor or computer is adapted to read and/or write.

Similar to storage array 160, storage array 180 includes a control unit 182 and memory 184. The control unit 182 is coupled to the memory 184 and may control the operation of storage array 180. In some examples, control unit 182 may include one or more processors and/or one or more multi-core processors. Storage array 180 further includes ports 191-194 for coupling storage array 180 to network switching devices using network links. In some examples, control unit 182 may use one or more protocols to communicate with the network switching devices using ports 191-194 and network links. In some embodiments, ports 191-194 may be included in one or more NICs. Although storage array 180 is shown with four ports 191-194, any number of ports may be used. As shown in FIG. 1, ports 191 and 192 of storage array 180 are coupled to two of the ports 136 of switch 130 and ports 193 and 194 are coupled to two of the ports 146 of switch 140 using respective network links. Although only two network links are shown, respectively, between storage array 180 and switches 130 and 140, any number of network links coupled to corresponding ports may be used between storage array 180 and switches 130 and/or switch 140. In some examples, the network links coupling storage array 180 to switches 130 and/or 140 may be combined into respective LAGs.

Storage array 180 further includes storage 186. Similar to storage 166, storage 186 may be used to store data and/or information based on one or more storage requests received from storage server 110, and also include one or more storage devices that each include one or more types of machine readable media.

Each of the memories 114, 134, 144, 164, and/or 184 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Storage network 100 demonstrates the use of redundancy and parallelism in the network connections between storage server 110 and storage arrays 160 and 180. When storage requests that include read and/or write requests are received by storage server 110 they may be forwarded to the corresponding storage array 160 and/or 180 where the requested data is stored. By placing multiple switches between storage server 110 and storage arrays 160 and 180, the storage requests may be forwarded from storage server 110 via any of several possible network paths to storage arrays 160 and/or 180. Storage server 110 has sixteen network paths it may use to forward a storage request to storage array 160. For example, a storage request for storage array 160 could be transmitted by storage server 110 using port 121 to switch 130. Switch 130 may then forward the request to port 171 of storage array 160. Some other possible network paths include port 121 to switch 130 to port 172, port 122 to switch 130 to port 171, port 122 to switch 130 to port 172, port 121 to switch 130 to switch 140 to port 173, port 121 to switch 130 to switch 140 to port 174, port 122 to switch 130 to switch 140 to port 173, port 122 to switch 130 to switch 140 to port 174, port 123 to switch 140 to port 173, port 123 to switch 140 to port 174, port 124 to switch 140 to port 173, port 124 to switch 140 to port 174, port 123 to switch 140 to switch 130 to port 171, port 123 to switch 140 to switch 130 to port 172, port 124 to switch 140 to switch 130 to port 171, and port 124 to switch 140 to switch 130 to port 172. In addition, the redundant network links in LAG 150 permit multiple options for forwarding the requests between switches 130 and 140. Similarly, there are sixteen network paths between storage server 110 and storage array 180, as well as sixteen network paths between storage array 160 and storage array 180.

And while the large number of network paths provides support for redundancy and/or high availability, further review of these network paths reveals that they may vary in potentially relevant network metrics including latency, hop count, efficiency, and/or the like. In some examples, each of the network paths that include forwarding between switches 130 and 140 using ISL 150 involves three hops rather than the two hops for the network paths that only go through one of the switches 130 or 140. The extra hop in these network paths may introduce additional latency, add additional congestion to switches 130 and/or 140, and/or use valuable bandwidth on ISL 150. In general, it would be preferable to avoid the network paths that use ISL 150.

As discussed above and further emphasized here, FIG. 1 is merely an example which should not unduly limit the scope of the claims. One of ordinary skill in the art would recognize many variations, alternatives, and modifications. In some embodiments, storage network 100 may include additional devices. In some examples, more than two switches may be used in the network between storage server 110 and storage arrays 160 and 180. In some examples, more than two storage arrays may be used. In some embodiments, other types of switches and/or switch topologies may be used. In some examples, any of the switches 130 and/or 140 may be replaced with a stacked switch and/or a virtual link trunking (VLT) peer group. In some examples, switches 130 and 140 may be replaced by a two-tier switching architecture using a plurality of leaf switches and one or more spine switches.

Figure 2:
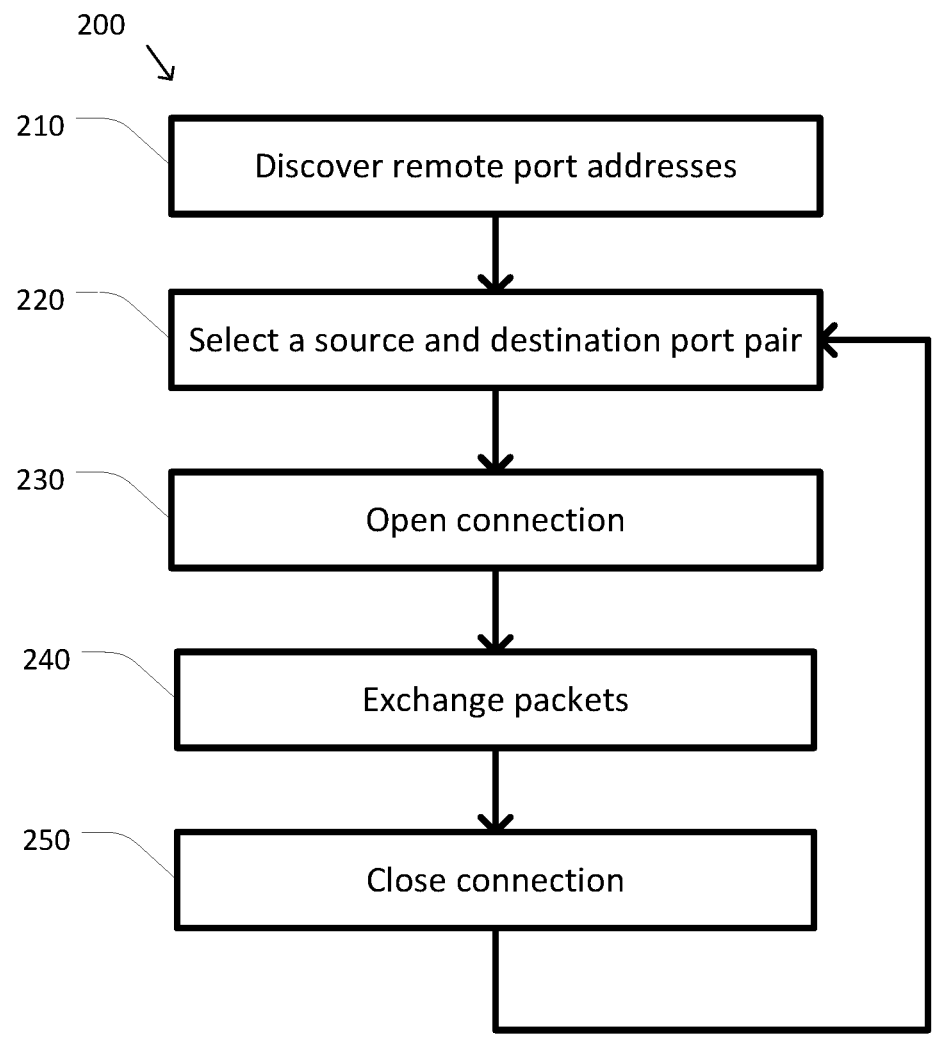
FIG. 2 is a simplified diagram of a method of exchanging information using a storage network according to some embodiments.

FIG. 2 is a simplified diagram of a method 200 of exchanging information using a storage network according to some embodiments. In some embodiments, one or more of the processes 210-250 of method 200 may be implemented, at least in part, in the form of executable code stored on non-transient, tangible, machine readable media that when run by one or more processors (e.g., the processors in control units 112, 162, and/or 182) may cause the one or more processors to perform one or more of the processes 210-250. In some embodiments, method 200 may be performed in a storage server, such as storage server 110, when the storage server communicates with a storage array, such as the storage arrays 160 and/or 180, to, for example, process a storage request. In some embodiments, method 200 may be performed in a storage array, such as the storage array 160 and/or 180, when the storage array communicates with another storage array and/or a storage server.

At a process 210, remote port addresses are discovered. In order to use a storage network, a storage server and/or storage arrays discover the port addresses of the ports of the other storage nodes that are remote to them in a storage network. The storage server discovers the port addresses of the storage arrays and each of the storage arrays discovers the port addresses of the storage server and the other storage arrays. In some examples, the storage network may be the storage network 100, the storage server may be the storage server 110, and/or the storage arrays may be the storage arrays 160 and/or 180. In some examples, each of the ports of the storage server and/or the ports of the storage servers may be assigned and/or associated with a layer 3 network address, such as an Internet Protocol (IP) address. In some embodiments, by exchanging packets between the storage server and the storage arrays, each of the ports of the storage server and/or the ports of the storage arrays may be discovered. In some examples, each of the storage arrays may transmit one or more packets from one or more ports that advertise the port address of each of the ports of the respective storage array. In some examples, the storage arrays may transmit login and/or similar requests that are responded to by the storage server that include the port address information. In some examples, the storage server may transmit one or more packets from one or more ports that advertise the port address of each of the ports of the storage server. As a result of process 210, the storage server and/or the storage arrays may discover the port addresses of each of the ports of the other devices (storage server and/or storage arrays) in the storage network.

At a process 220, a source and a destination port pair are selected. When a storage server desires to exchange information with a storage array, the storage server selects one of its local ports as the source port and one of the ports on the storage array as the destination port to select the pair of ports between which the information and/or network packets are to be exchanged. In some examples, the storage server may desire to exchange information in order to respond to a storage request. When a storage array desires to exchange information with another storage array and/or the storage server, the storage array may similarly select one of its ports as the source port and one of the ports on the destination device as the destination port. In some examples, selection of the source port and the destination port from among the ports supported by the source and destination device may support flexible use of the many network paths in the storage network. In some examples, the source port and the destination port may be selected to support load balancing and/or some other criteria within the storage network.

At a process 230, a connection is opened. Using the source and destination port pair selected during process 220, a connection between the source port and the destination port is opened. The connection may be opened by exchanging network packets between the source device and the destination device by sending and/or receiving handshake packets between the port addresses of the source port and destination port, as is known in the art. In some examples, a connection request may be transmitted with a destination address set to the port address of the destination port and a source address set to the port address of the source port. In some examples, the connection may be an iSCSI connection. In some examples, the connection may be a transport control protocol (TCP) session.

At a process 240, packets are exchanged. Using the connection opened during process 230, the source device and the destination device exchange one or more packets. In some examples, the one or more packets are exchanged between the source port and the destination port using an intervening network. The one or more packets may include data and/or handshake information. In some examples, the packets may include iSCSI packets. In some examples, the data may include data that is to be read from and/or written to storage, such as storage 166 and/or 186.

At a process 250, the connection is closed. After exchanging packets during process 240, the connection opened during process 230 is closed. In some examples, the connection may be closed by exchanging one or more handshake packets between the source port and the destination port. In some examples, the connection is closed when use of the connection is complete. In some examples, the connection is closed after the storage request, which resulted in the opening of the connection, is served. Additional connections between a source device and a destination device may be selected, opened, used, and closed by repeating processes 220-250.

Method 200 generally selects and utilizes source and destination port pairs with little concern regarding the topology and/or interconnectivity of the network between the source port and the destination port. For example, method 200 may be used with the storage network 100 of FIG. 1. During the discovery of process 210, the port addresses associated with ports 121-124 on storage server 110 as well as the port addresses associated with ports 171-174 and 191-194 on storage arrays 160 and 180 may be discovered. Consider the case where storage server 110 receives a storage request to read data stored in storage 166 of storage array 160. Storage server 110 may select and utilize ports 121-124 and ports 171-174 of storage array 160 during process 220. This is possible because storage server 110 knows from the discovery process 210 that any of its ports 121-124 may reach any of the ports 171-174 of storage array 160 through the intervening network. In some examples, storage server 110 may select from among the ports 121-124 and the ports 171-174 to satisfy a selection criteria, such as a selection criteria based on load balancing, round robin priorities, and/or the like. This approach may not select a pair of ports that best utilizes the intervening network. As discussed above, not all the paths through switches 130 and/or 140 are as desirable, especially those that use ISL 150. As an example, should storage server 110 select port 122 as the source port and port 173 as the destination port, this would result in network traffic associated with the opening of a connection during process 230, the exchanging of packets during process 240, and the closing of the connection during process 250, to be forwarded through both switches 130 and 140 and along ISL 150. This is generally not preferable. In contrast, when the source port is 122 and the destination port is 171, the network path between storage server 110 and storage array 160 includes switch 130, but avoids switch 140 and ISL 150. This would generally be preferable to the source port 122 and destination port 173 port pair.

Consequently, method 200 may be improved by more intelligently selecting from among ports 121-124 and 171-174 during process 220. One solution may be to provide storage server 110 and storage arrays 160 and 180 with detailed information regarding the topology and/or interconnectivity of the network between themselves. This is generally not desirable as it interferes with the general principles of network layering where each layer in the network assumes responsibility for different networking issues. For example, because storage server 110 and storage arrays 160 and 180 generally operate in layer 3 or above in the network, they generally receive little knowledge of intervening networks beyond general information regarding which addresses may be reached from which ports. Additionally, the storage server 110 and the storage arrays 160 and 180 would also have to monitor network topology changes associated with down network links, congestion, and/or the like. Thus, a better solution may involve providing storage server 110 and/or storage arrays 160 and 180 with sufficient information to determine which source and destination port pairs are preferable over others.

Figure 3:
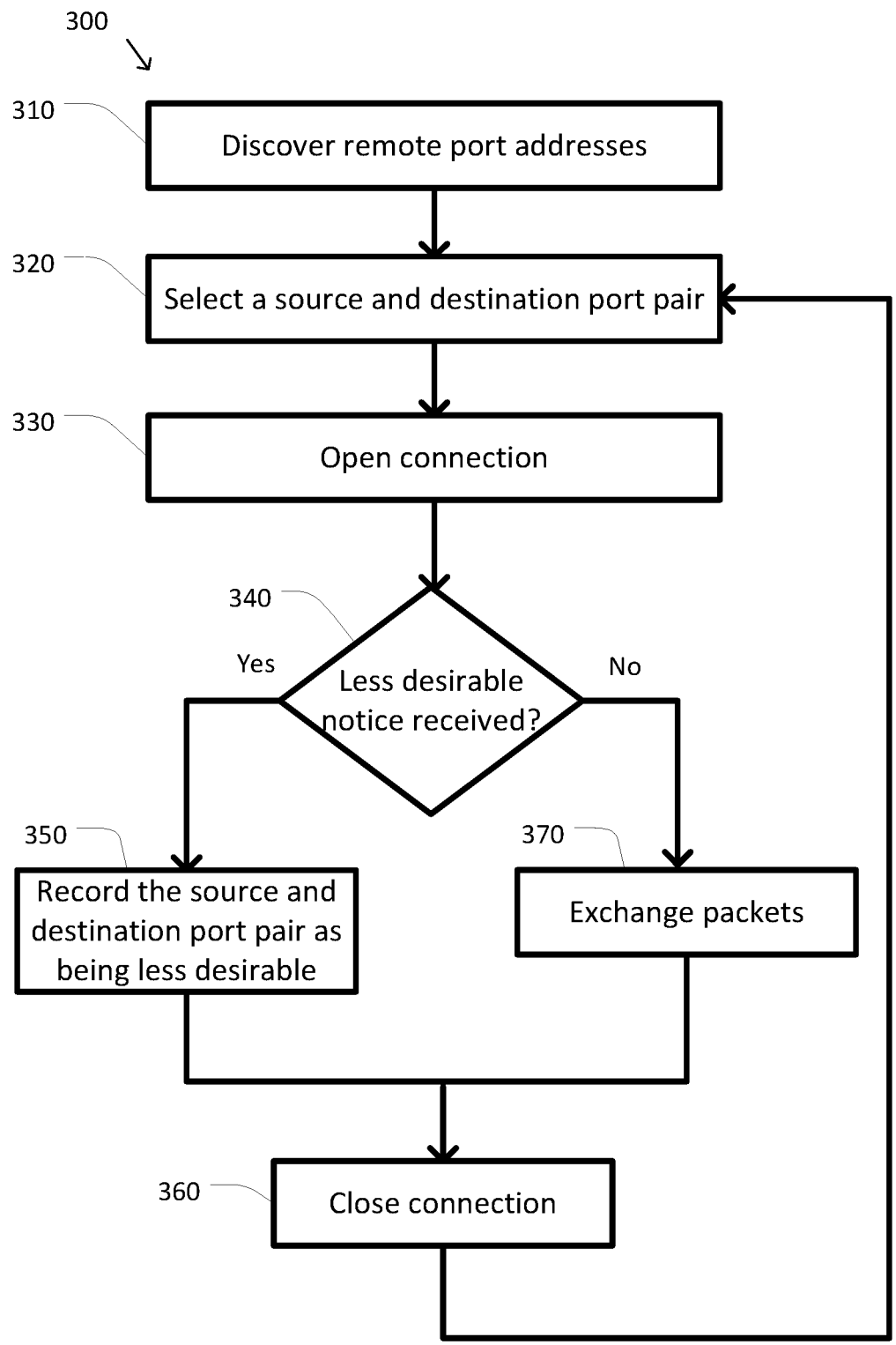
FIG. 3 is a simplified diagram of a method of exchanging information using a storage network according to additional embodiments.

FIG. 3 is a simplified diagram of a method 300 of exchanging information using a storage network according to additional embodiments. In some embodiments, one or more of the processes 310-370 of method 300 may be implemented, at least in part, in the form of executable code stored on non-transient, tangible, machine readable media that when run by one or more processors (e.g., the processors in control units 112, 162, and/or 182) may cause the one or more processors to perform one or more of the processes 310-370. In some embodiments, method 300 may be performed in a storage server, such as storage server 110, when the storage server communicates with a storage array, such as the storage arrays 160 and/or 180, to, for example, process a storage request. In some embodiments, method 300 may be performed in a storage array, such as the storage array 160 and/or 180, when the storage array communicates with another storage array and/or a storage server.

At a process 310, remote port addresses are discovered. In some examples, process 310 may be similar to process 210. As a result of process 310, the storage server and/or the storage arrays may discover the port addresses of each of the ports of the other devices (storage server and/or storage arrays) in the storage network.

At a process 320, a source and a destination port pair are selected. In some examples, process 320 may be similar to process 220. Process 320, however, improves on process 220 by more intelligently selecting the local or source port and the remote or destination port. The storage server and/or the storage array selecting the source port and destination port pair may maintain a list of less desirable source and destination port pairs. When selecting the source port and destination port pair, the storage server and/or the storage array may give a preference to source port and destination port pairs that are not on the less desirable list. This permits for the more intelligent selection of the source port and destination port pair during process 320. For example, the source port and destination port pair of port 122 and port 173 may be included in the less desirable list because use of that port pair includes forwarding network packets using ISL 150.

At a process 330, a connection is opened. Using the source and destination port pair selected during process 320, a connection between the source port and the destination port is opened. The process 330 may be similar to process 230.

At a process 340, it is determined whether a less desirable notice is received. During the opening of the connection during process 330, several network packets are typically exchanged between the selected source and destination ports. In some examples, these network packets may be monitored by the intervening switches of the network as will be discussed in further detail in FIG. 4. As a result of this monitoring of the packets, the storage server and/or the storage array opening the connection may receive a less desirable notice from one or more of the intervening switches. The less desirable notice indicates that the source port and destination port pair being used to form the connection is less desirable and that it may be advantageous to select a different source port and destination port pair. In some examples, the less desirable notice may be received on the source port. In some examples, the less desirable notice may be received in a network packet. In some examples, the less desirable notice may be received as a type-length-value (TLV) field of a Linked Layer Discovery Protocol (LLDP) message. When a less desirable notice is received, this is recorded using a process 350. When a less desirable notice is not received, packets are exchanged using a process 370.

At the process 350, the source and destination port pair is recorded as being less desirable. Upon receiving the less desirable notice during process 340, the storage server and/or the storage array may record the lesser desirability of the source port and destination port pair in the less desirable list. In some examples, the less desirable list may be stored in any suitable data structure, database, and/or storage structure that permits identifying whether a particular source port and destination port pair is less desirable or not. After the source port and destination port pair is recorded as less desirable, the connection is closed using process 360 and another, hopefully more desirable, source port and destination port pair may be selected using process 320.

At a process 360, the connection is closed. In some examples, process 360 may be similar to process 250. In some examples, the connection is closed when use of the connection is complete. In some examples, the connection is closed when the connection is determined to be less desirable. In some examples, the connection is closed after the exchange of packets during process 370. Additional connections between a source device and a destination device may be selected, opened, used, and closed by repeating processes 320-370.

At a process 370, packets are exchanged. Process 370 may be similar to process 240. Using the connection opened during process 330, the source device and the destination device exchange one or more packets. In some examples, the one or more packets are exchanged between the source port and the destination port using the intervening network. The one or more packets may include data and/or handshake information. In some examples, the data may include data that is to be read from and/or written to storage, such as storage 166 and/or 186.

As discussed above and further emphasized here, FIG. 3 is merely an example which should not unduly limit the scope of the claims. One of ordinary skill in the art would recognize many variations, alternatives, and modifications. In some embodiments, packets may be exchanged even through the source port and destination port pair is recorded as less desirable. In some examples, after recording that the source port and destination port pair is less desirable during process 350, packets may be exchanged between the source device and the destination device using a process similar to process 370 and/or 240. After the packets are exchanged, then the connection may be closed using process 360.

Figure 4:
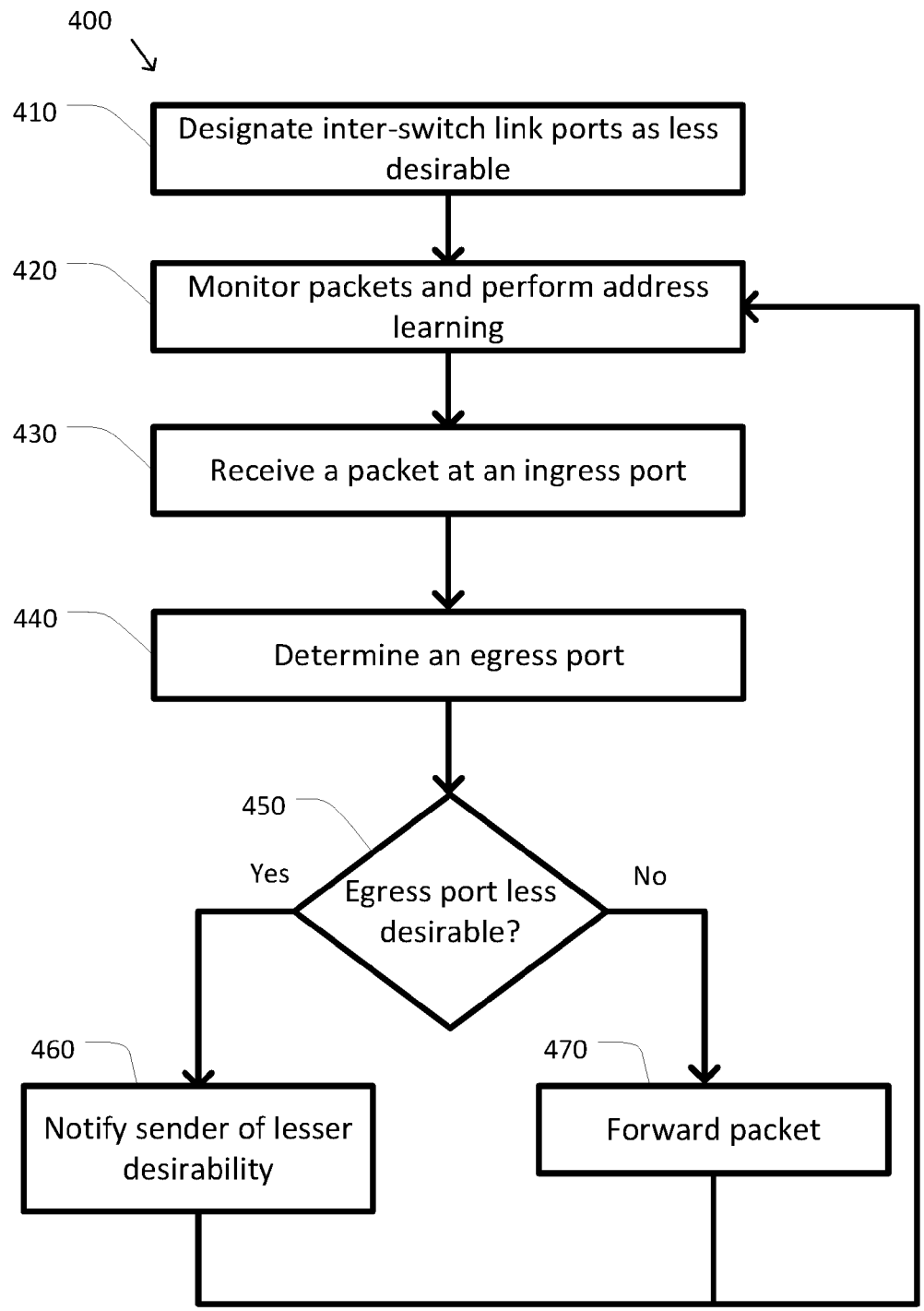
FIG. 4 is a simplified diagram of a method of forwarding network packets in a storage network according to some embodiments.

FIG. 4 is a simplified diagram of a method 400 of forwarding network packets in a storage network according to some embodiments. In some embodiments, one or more of the processes 410-470 of method 400 may be implemented, at least in part, in the form of executable code stored on non-transient, tangible, machine readable media that when run by one or more processors (e.g., the processors in control units 132 and/or 142) may cause the one or more processors to perform one or more of the processes 410-470. In some embodiments, method 400 may be performed in a switch, such as switch 130 and/or 140.

At a process 410, inter-switch links are designated as less desirable. In order to discourage use of network paths that utilize ISLs, such as ISL 150, ports associated with each ISL are designated as less desirable. In some examples, the ISLs may be designated as less desirable during provisioning and/or configuration of the corresponding switch that is coupled to the ISL. In some examples, the designation may be set by a network operator and/or technician. In some examples, the designation may occur when the corresponding ISL is designated and/or discovered to be an ISL. In some examples, when the ISL is associated with a LAG, the LAG may be designated as less desirable.

At a process 420, packets are monitored and address learning is performed. As the switch forwards and/or routes packets through the network it monitors the packets and performs address learning. In some examples, this is one of the ways that the switch learns the network paths between a storage server and one or more storage arrays. In some examples, the storage server may be storage server 110 and/or the one or more storage arrays may include storage arrays 160 and/or 180. In some examples, the monitoring and/or learning may include flooding, determination of spanning trees, and/or the like. In some examples, the addresses learned may include layer 2 addresses, such as MAC addresses. In some examples, the addresses learned may include layer 3 addresses, such as IP addresses. In some examples, the addresses learned may be stored in one or more data structures including one or more next hop tables, MAC address tables, forwarding tables, forwarding information bases, IP address tables, routing tables, flow control tables, and/or the like.

At a process 430, a packet is received at an ingress port. In some examples, the packet may be an iSCSI packet. In some examples, the packet may be a packet exchanged by a storage server and/or a storage array during process 240 and/or 370. In some examples, the packet may be a packet associated with the opening and/or closing of a connection during any of the processes 230, 250, 330, and/or 360.

At a process 440, an egress port is determined. The egress port on which to forward the packet received during process 430 is determined. In some examples, the egress port may be determined by examining the packet for a destination address and selecting the egress port using the forwarding data structures learned during process 420. In some examples, an egress LAG may be determined instead of an egress port.

At a process 450, it is determined whether the egress port is less desirable. Using the designations of the less desirable ports from process 410, it is determined whether the egress port determined during process 440 is less desirable. In some examples, the egress port may be less desirable when it is part of an ISL. When the egress port is less desirable, the sender of the packet is notified using a process 460. When the egress port is not less desirable, the packet is forwarded using a process 470.

At the process 460, the sender of the packet is notified of the lesser desirability. When the switch determines that the packet is to be forwarded using a port and/or a LAG designated as being less desirable, a less desirable notice may be transmitted to the sender of the packet. In some examples, the less desirable notice may be the less desirable notice received by the storage server and/or the storage array during process 340. In some examples, the less desirable notice may include a source address and/or a destination address as included in the packet received during process 430. In some examples, the less desirable notice may be transmitted using one or more packets. In some examples, the less desirable notice may be transmitted using one or more TLVs in one or more LLDP messages. After the less desirable notice is sent, packet monitoring, address learning, and/or packet receiving may continue by repeating processes 420-470.

At a process 470, the packet is forwarded. The packet received during process 430 is forwarded using the egress port determined during process 440.

As discussed above and further emphasized here, FIG. 4 is merely an example which should not unduly limit the scope of the claims. One of ordinary skill in the art would recognize many variations, alternatives, and modifications. In some embodiments, the packet may be forwarded even though the less desirable notice is sent during process 460.

In some examples, the packet may be forwarded using a process similar to process 470. In some embodiments, the less desirable notification may be transmitted to more than just the sender. In some examples, the less desirable notice may also be transmitted to the destination address included in the packet received during process 430.

Some embodiments of the storage server 110 and/or the storage arrays 160 and/or 180 may include non-transient, tangible, machine readable media that include executable code that when run by one or more processors may cause the one or more processors (e.g., the one or more processors of the control units 112, 162, and/or 182) to perform the processes of method 200 and/or 300 as described above. Some embodiments of the switches 130 and/or 140 may include non-transient, tangible, machine readable media that include executable code that when run by one or more processors may cause the one or more processors (e.g., the one or more processors of the control units 132 and/or 142) to perform the processes of method 400 as described above. Some common forms of machine readable media that may include the processes of methods 200, 300, and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of communicating in a network, the method comprising:
   selecting, by a first network node, a first port from a plurality of second ports of the first network node;
   selecting, by the first network node, a third port from a plurality of fourth ports of a second network node, the first port and the third port forming a first port pair;
   opening a first connection between the first port and the third port for a data exchange between the first network node and the second network node;
   determining, by the first network node, whether a less desirable notice associated with the first port pair is received at the first port from a switch along a path of the first connection based on whether the less desirable notice includes an address of the first network node and an address of the second network node; and
   when the less desirable notice is received, recording, by the first network node, the first port pair as being less desirable to indicate that it would be advantageous to use a different port pair to exchange network packets between the first network node and the second network node.

2. The method of claim 1, further comprising:
   when the less desirable notice is received:
   closing the first connection;
   selecting, by the first network node, a second port pair different from the first port pair, the second port pair comprising a fifth port selected from the second ports and a sixth port selected from the fourth ports, wherein the fifth port is different from the first port, the sixth port is different from the third port, or the fifth port is different from the first port and the sixth port is different from the third port; and
   opening a second connection between the fifth port and the sixth port.

3. The method of claim 1, further comprising exchanging packets between the first network node and the second network node using the first connection.

4. The method of claim 1, further comprising selecting, by the first network node, the first port pair based on previously received less desirable notices.

5. The method of claim 1, wherein:
   the first network node is a storage server or a storage array; and
   the second network node is a storage server or a storage array.

6. The method of claim 1, wherein the less desirable notice includes a first port address associated with the first port and a second port address associated with the third port.

7. The method of claim 6, wherein the first and second port addresses are layer 3 network addresses.

8. A network node comprising:
   a control unit; and
   a plurality of local ports coupled to the control unit and configured to couple the network node to a network;
   wherein the control unit is configured to:
   select a first port from the plurality of local ports;
   select a second port from a plurality of ports of a second network node, the first port and the second port forming a first port pair;
   open a first connection between the first port and the second port for a data exchange between the network node and the second network node;
   determine whether a less desirable notice associated with the first port pair is received at the first port from a switch along a path of the first connection based on whether the less desirable notice includes an address of the network node and an address of the second network node; and
   when the less desirable notice is received, record the first port pair as being less desirable indicating that it would be advantageous to use a different port pair to exchange network packets with the second network node.

9. The network node of claim 1, wherein the control unit is further configured to:
   close the first connection;
   select a second port pair different from the first port pair, the second port pair comprising a third port selected from the plurality of local ports and a fourth port selected from the ports of the second network node, wherein the third port is different from the first port, the fourth port is different from the second port, or the third port is different from the first port and the fourth port is different from the second port; and
   open a second connection between the third port and the fourth port.

10. The network node of claim 1, wherein the control unit is further configured to exchange packets with the second network node using the first connection.

11. The network node of claim 1, wherein the control unit is further configured to select the first port pair based on previously received less desirable notices.

12. The network node of claim 1, wherein:
the network node is a storage server or a storage array; and
the second network node is a storage server or a storage array.

13. The network node of claim 1, wherein the less desirable notice includes a first port address associated with the first port and a second port address associated with the second port.

14. The network node of claim 13, wherein the first and second port addresses are layer 3 network addresses.

15. A network switching device comprising:
a control unit; and
a plurality of ports coupled to the control unit, the plurality of ports including a first port configured to couple the network switching device to a first network node;
wherein the control unit is configured to:
designate the first port as less desirable;
monitor packets received on the plurality of ports to perform address learning;
receive a packet on the first port from the first network node;
determine an egress port, selected from the plurality of ports, for the packet based on the address learning and a destination address included in the packet; and
when the egress port is designated as less desirable, transmit a less desirable notice to the first network node indicating that it would be advantageous for the first network node to exchange network packets using different ports.

16. The network switching device of claim 15, wherein the control unit is further configured to forward the packet on the egress port to a second network node associated with the destination address.

17. The network switching device of claim 15, wherein the control unit is further configured to transmit the less desirable notice to a second network node associated with the destination address.

18. The network switching device of claim 15, wherein:
the packet further includes a source address; and
the less desirable notice includes the source address and the destination address.

19. The network switching device of claim 15, wherein:
the egress port is associated with a link aggregation group (LAG); and
the control unit is further configured to designate the LAG as less desirable when the LAG is an inter-switch link.

20. The network switching device of claim 15, wherein the destination address is a layer 3 network address.

* * * * *